United States Patent
Hinkel et al.

(10) Patent No.: US 8,462,171 B2
(45) Date of Patent: Jun. 11, 2013

(54) SATURATION CONTRAST IMAGE ENHANCEMENT

(75) Inventors: Bradley Lawrence Hinkel, Kirkland, WA (US); Eric Paul Bennett, Kirkland, WA (US); Morgan Avery Conbere, Menlo Park, CA (US); Ellen Towle Kephart, Lafayette, CA (US); Matthew Nicholas McKnett, Bellevue, WA (US)

(73) Assignee: Micrososft Corporation, Redmond, WA (US)

( * ) Notice: Subject to any disclaimer, the term of this patent is extended or adjusted under 35 U.S.C. 154(b) by 920 days.

(21) Appl. No.: 12/366,821

(22) Filed: Feb. 6, 2009

(65) Prior Publication Data
US 2010/0201886 A1 Aug. 12, 2010

(51) Int. Cl.
*G09G 5/02* (2006.01)

(52) U.S. Cl.
USPC .......................................... 345/589; 345/604

(58) Field of Classification Search
USPC ................................................ 345/589, 604
See application file for complete search history.

(56) References Cited

U.S. PATENT DOCUMENTS

| | | | |
|---|---|---|---|
| 5,581,370 A | 12/1996 | Fuss et al. | |
| 5,715,334 A | 2/1998 | Peters | |
| 6,462,748 B1 | 10/2002 | Fushiki et al. | |
| 7,184,056 B2 | 2/2007 | Brody et al. | |
| 7,292,371 B2 | 11/2007 | Kuwata et al. | |
| 7,319,787 B2 | 1/2008 | Trifonov et al. | |
| 2007/0076127 A1* | 4/2007 | Abe et al. | 348/645 |
| 2007/0121141 A1* | 5/2007 | Takabayashi et al. | 358/1.9 |
| 2007/0177033 A1 | 8/2007 | Bennett et al. | |
| 2007/0248264 A1 | 10/2007 | Graves et al. | |
| 2008/0043268 A1* | 2/2008 | Bang et al. | 358/1.9 |
| 2009/0141977 A1* | 6/2009 | Hong et al. | 382/167 |

OTHER PUBLICATIONS

"Photoshop Tutorials Blog ", Retrieved at <<http://pstutorialsblog.com/29/free-photoshop-plugins-photo-plugins/>>, Dec. 19, 2008, pp. 6.
"Video and Image Processing Blockset ", Retrieved at<<http://www.mathworks.com/access/helpdesk/help/toolbox/vipblks/index.html?/access/helpdesk/help/toolbox/vipblks/ref/contrastadjustment.html &http://www.google.co.in/search?client=firefox-a&rls=org.mozilla%3Aen-US%3Aofficial&channel=s&hl=en&q=individual+pixel+saturation+contrast+adjustment&meta=&btnG=Google+Search>>, Dec. 19, 2008, pp. 6.
International Color Consortium; "Specification ICC.1:2004-10, Profile version 4.2.0.0"; 2004; 112 pages.
Lindbloom, B.; "Useful color equations"; accessed at http://www.brucelindbloom.com/Equations.html; last revised Apr. 15, 2003; 2 pages.

(Continued)

*Primary Examiner* — Aaron M Richer (57) ABSTRACT

A digital imaging tool and a method for enhancing, or adjusting, a saturation contrast of a digital image is provided. The digital imaging tool may convert an original color space of a digital image to a second color space having a saturation channel. The digital imaging tool may define a function based, at least partially, on one or more user-provided parameters. Saturation values of pixels of the digital image, in the second color space, may be adjusted, or enhanced, by applying each of the saturation values to the defined function to produce corresponding enhanced saturation values. The second color space then may be converted back to the original color space and a saturation-enhanced version of the digital image may be presented and/or saved.

23 Claims, 6 Drawing Sheets

OTHER PUBLICATIONS

Kuppers, H.; "Color: Origin, Systems, Uses"; New York: Van Nostrand Reinhold; 1972 (in seven PDFs).

Long, B.; "Complete Digital Photography"; Charles River Media; 2001 (in eight PDFs).

Overheim, R. D. et al.; "Light and Color"; John Wiley & Sons; 1982 (in twelve PDFs).

Parent, R.; "Computer Animation: Algorithms and Techniques"; Morgan Kaufmann; 2002; p. 459.

Westland, S. et al.; "Computational Colour Science using MATLAB"; John Wiley & Sons; 2004. (in two PDFs).

Wright, T. The Photography Handbook. Routledge. 1999 (in three PDFs).

* cited by examiner

SATURATION CONTRAST IMAGE ENHANCEMENT

BACKGROUND

Digital photographers often adjust a contrast of digital images to make the digital images more appealing to viewers. Typically, this is done by enhancing a brightness contrast by making bright regions brighter and dark regions darker, thereby increasing a relative ratio between bright regions and dark regions.

Digital photographers also may enhance digital images by modifying color saturation. Tools exist which permit digital photographers to adjust color saturation, but the tools have their limitations. For example, the existing tools use traditional color models, such as, for example, RGB (Red, Green and Blue) and HSV (Hue, Saturation and Value), which rely on physical models of light. Editing the saturation in traditional color models is not intuitive and often results in shifts in hue or an unnatural appearance. Further, the existing tools only support uniform changes to saturation, which has no effect on saturation contrast.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In various embodiments, a digital imaging tool may be provided for enhancing a saturation contrast of a digital image. The digital imaging tool may convert an original color space of a digital image to a second color space having a saturation channel. The saturation channel may include saturation values of all pixels of the digital image. The second color space may be a traditional color space, such as, for example, HSV, a perceptually uniform color space, such as, for example, CIE (Commission Internationale de l'Eclairge) LCH (also known as CIELCH), or another color space.

A user may provide one or more user-provided parameters, based upon which, a function may be defined. In some embodiments, the function may be an s-curve function, such that when saturation values of respective pixels of the digital image are applied to the s-curve function, resulting enhanced saturation values of some of the pixels may be greater than corresponding original saturation values and enhanced saturation values of others of the pixels may be less than corresponding original saturation values.

The digital imaging tool then may convert the second color space, including the enhanced saturation values, back to the original color space and a saturation-enhanced digital image may then be presented to a user and/or saved.

In some embodiments, only saturation values of pixels that satisfy a luminance threshold condition may be applied to the function. As a result, the saturation contrast of dark regions of the digital image may remain unchanged.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a digital imaging tool and a method are provided for enhancing a saturation contrast of digital images. In various embodiments, the saturation contrast of a digital image may be enhanced by first, converting an original color space of the digital image to a second color space having a saturation channel, including, but not limited to HSV (Hue, Saturation and Value). The original color space may be RGB, sRGB (standard Red, Green and Blue), or another traditional color model. In some embodiments, the second color space may be a perceptually uniform color space, including, but not limited to CIE (Commission Internationale de l'Eclairge) LCH (also known as CIELCH). The CIELCH color space has three axes. An L axis represents lightness, a C axis represents chroma or saturation, and an H axis represents hue.

Next, a saturation contrast enhancement may be applied to the saturation channel (saturation values of pixels of the digital image). In some embodiments, a user may provide one or more inputs, based upon which, a function may be defined. The respective saturation values of the pixels of the digital image may be applied to the function to produce enhanced saturation values. Some of the enhanced saturation values may be greater than corresponding ones of the respective saturation values, while others of the enhanced saturation values may be less than corresponding ones of the respective saturation values. In some embodiments, the defined function may be an s-curve, but other functions may be employed in other embodiments.

The second color space, including the enhanced saturation values of the pixels of the digital image, may then be converted back to the original color space and a saturation-enhanced version of the digital image may be presented and/or saved.

Exemplary Processing Device

Figure 1:
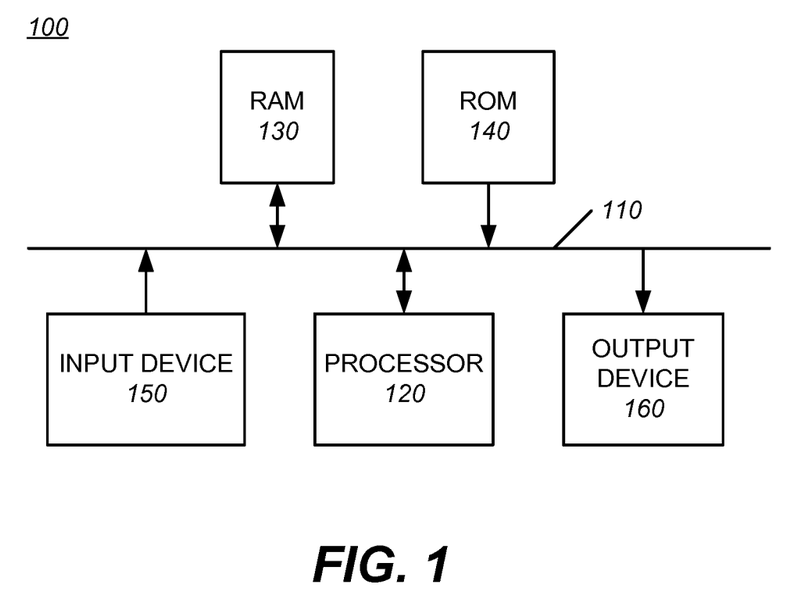
FIG. 1 is a functional block diagram of an exemplary processing device which may implement a digital imaging tool consistent with the subject matter of this disclosure.

FIG. 1 is a functional block diagram of an exemplary processing device 100, which may be used to implement embodiments of a digital imaging tool consistent with the subject matter of this disclosure. Processing device 100 may be a desktop personal computer (PC), a notebook or laptop PC, a digital camera, or other processing device capable of being used as a digital imaging tool. Processing device 100 may include a bus 110, a processor 120, a random access memory 130, a read only memory (ROM) 140, an input device 150, and an output device 160. Bus 110 may permit communication among components of processing device 100.

Processor 120 may include one or more conventional and/or graphical processors that interpret and execute instructions. A memory may include a RAM (Random Access Memory) 130, a ROM (Read Only Memory) 140, or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120.

Input device 150 may include a keyboard, a pointing device, an electronic pen, a touchscreen, or other device for providing input. Output device 160 may include a display, a printer, or other device for outputting information including, but not limited to, digital images.

Processing device 100 may perform functions in response to processor 120 executing sequences of instructions contained in a tangible machine-readable medium, such as, for example, RAM 130, ROM 140 or other tangible machine-readable medium. Such instructions may be read into RAM 130 from another machine-readable medium or from a separate device via a communication interface (not shown).

Exemplary Processing

Figure 2:
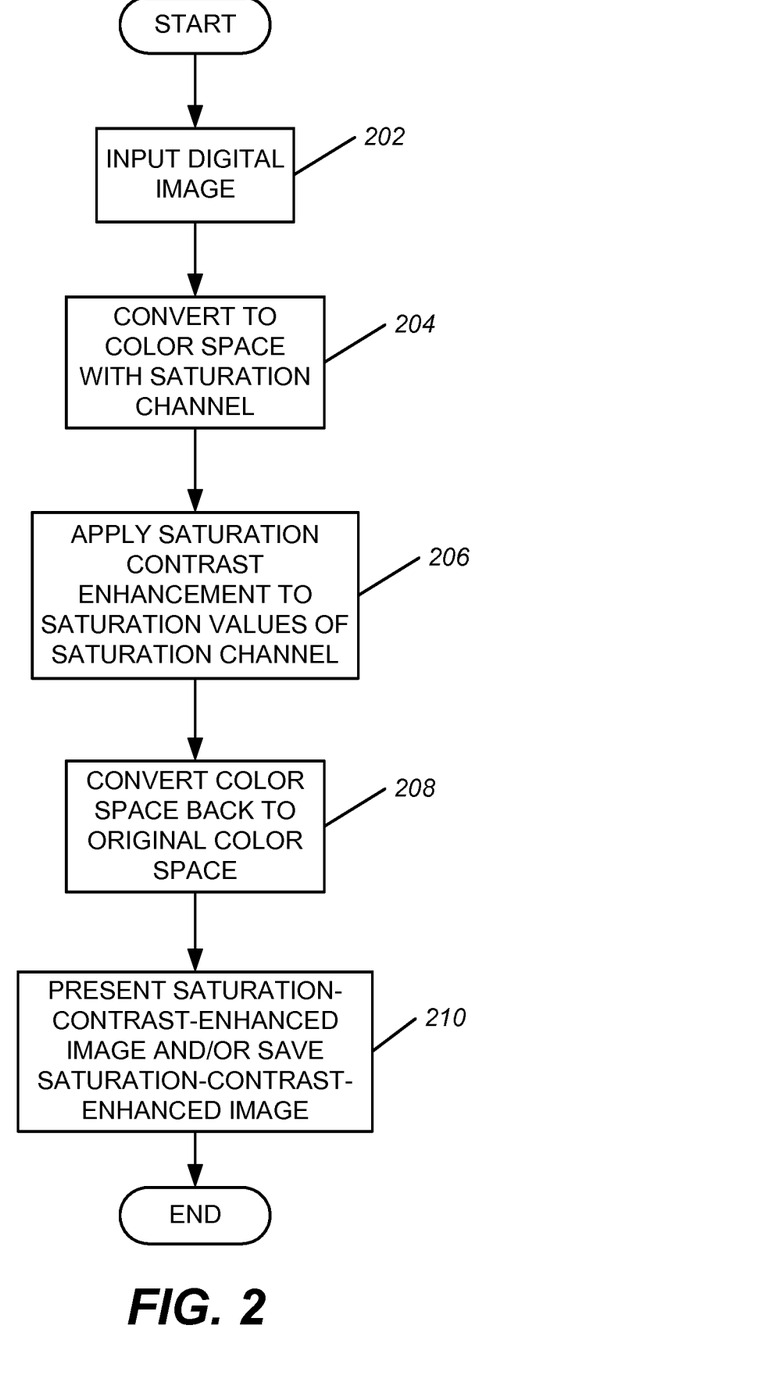
FIG. 2 is a flowchart of an exemplary process for enhancing a saturation contrast of a digital image.

FIG. 2 is a flowchart of an exemplary process that may be performed in various embodiments of a digital imaging tool. The process may begin with a digital image being input into a memory including, but not limited to, RAM 130, of a digital imaging tool (act 202). Assuming that an original color space of the digital image does not include a saturation channel, processor 120 may convert the original color space to a second color space, which includes a saturation channel (act 204). The second color space may be the HSV color space, a perceptually uniform color space, such as, for example, CIELCH, or another color space. Processor 120 may then apply a saturation contrast enhancement to saturation values of pixels of the digital image (the saturation channel) (act 206).

Figure 3:
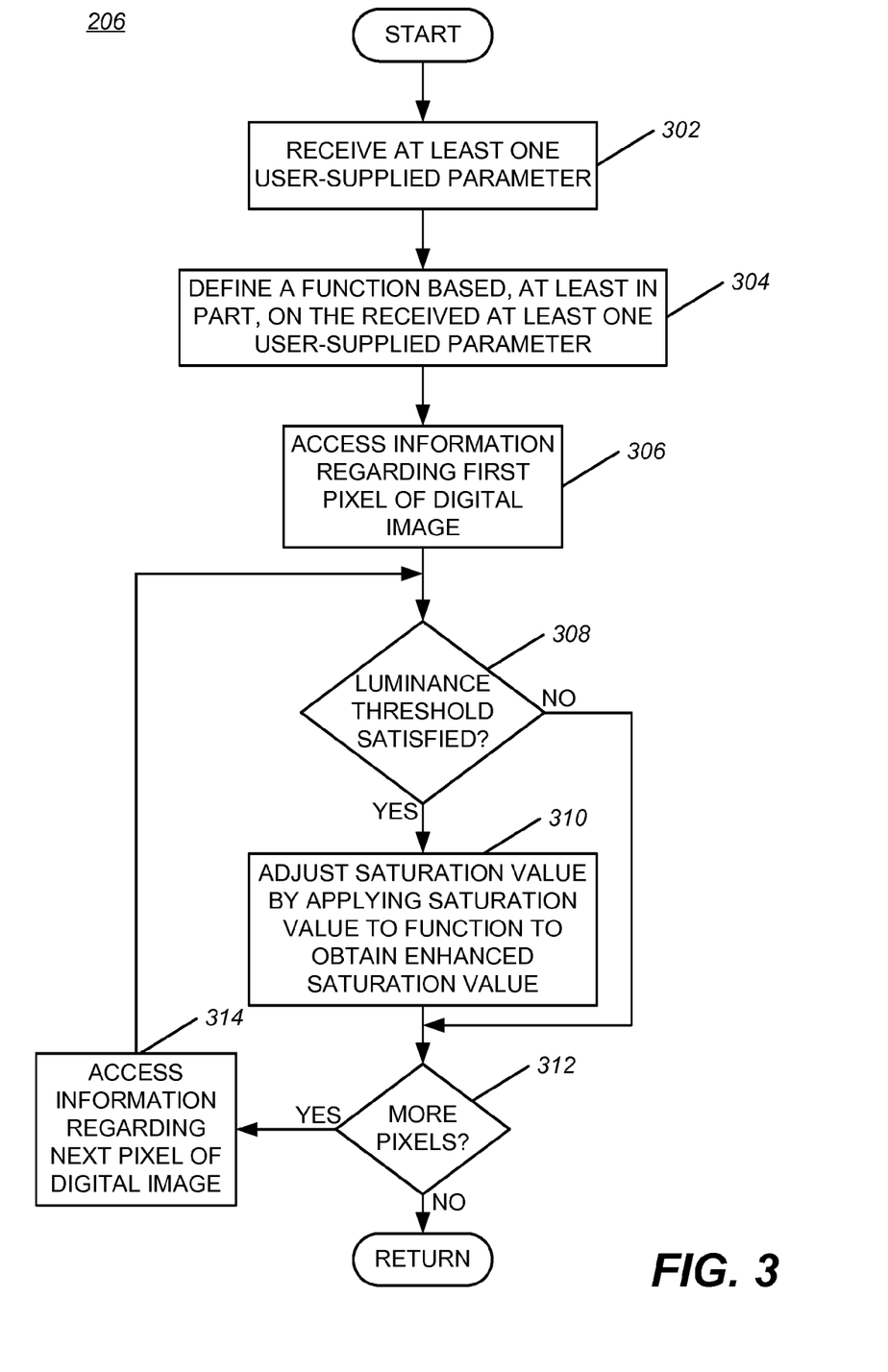
FIG. 3 is a flowchart illustrating a detailed exemplary process for defining a function based, at least partially, on one or more user-provided parameters, and for applying respective saturation values of pixels of a digital image to the function to produce corresponding enhanced saturation values.

FIG. 3 is a flowchart illustrating an exemplary process for performing act 206 in an embodiment. The process may begin by receiving one or more user-supplied parameters, which may represent various aspects of a function (act 302). Next, the function may be defined based, at least in part, on the received one or more user-supplied parameters (act 304). In some embodiments, the function may be an s-curve. Although a number of different s-curves may be used, one example of an s-curve may be defined as:

$$f(x) = (1-m) + m\left(s + Q(s)\left(\frac{1}{1 + e^{P(t)k(s+Q(s)x)+1}}\right)\right) \quad \text{Equation 1}$$

where m=input magnitude parameter; $0 \leq m \leq 1$,
t=input threshold parameter; $-0.5 \leq t \leq 0.5$,
s=ceiling(t),
Q(s)=1−2 s, and $$P(t) = \frac{2}{1 + \alpha|t|^{0.3} - \beta|t|^{0.6}} \quad \text{Equation 2}$$

In some embodiment, k=6.0, $\alpha$=0.3758773, and $\beta$=1.9481615, although other values of k, $\alpha$, and $\beta$ may be used in other embodiments. A value of m determines a strength of a saturation contrast effect. A value of t differentiates between low saturation and high saturation. In other words, t determines what areas of a digital image will have increased saturation and what areas of the digital image will have decreased saturation. Changing the value of t causes an inflection point of the s-curve to move along an x axis. A low value of t results in more of the digital image becoming highly saturated, while a high value of t results in a greater proportion of the digital image being less saturated. Further, because some pixels of the digital image may have increased saturation and other pixels of the digital image may have decreased saturation, the digital imaging tool independently produces enhanced saturation values for each of the pixels of the digital image.

Figure 4:
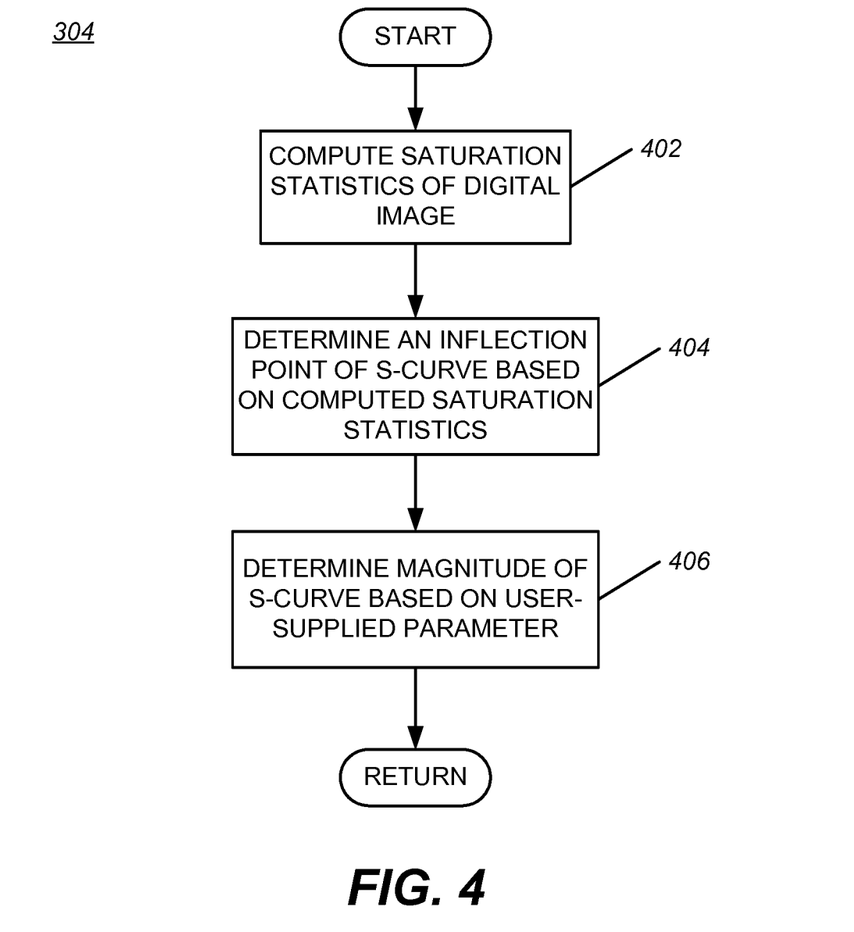
FIG. 4 is a flowchart illustrating a detailed exemplary process for defining a function for enhancing a saturation contrast of a digital image.

In another embodiment of act 304, a function for enhancing saturation contrast may be defined based on only one user-supplied parameter. FIG. 4 is a flowchart illustrating an exemplary process in which a function for enhancing saturation contrast is defined based, at least partly, on the one user-supplied parameter.

Figure 5:
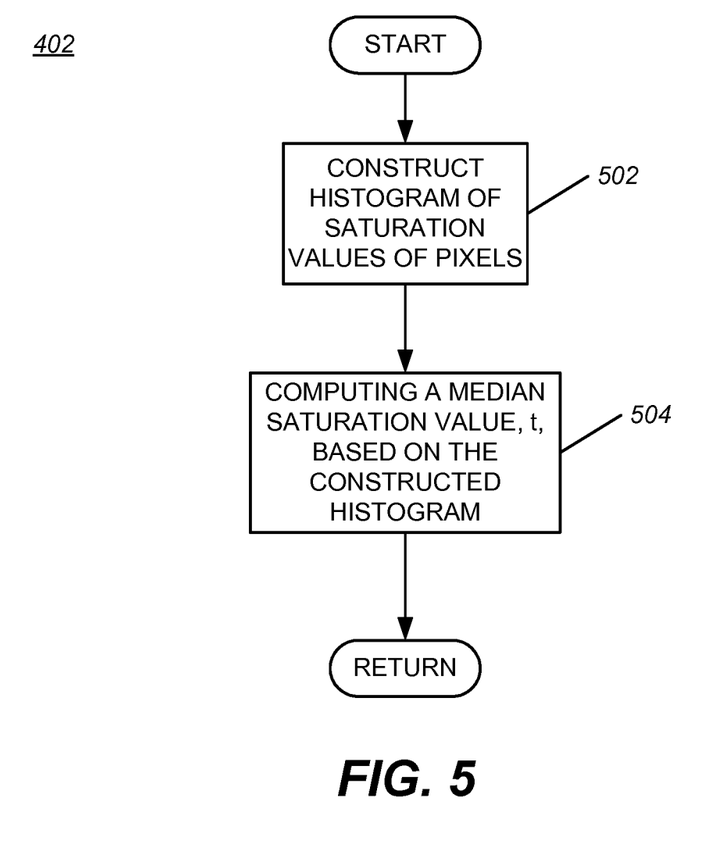
FIG. 5 is a flowchart illustrating an exemplary process for computing saturation statistics of a digital image, upon which a function for enhancing saturation values may be based, at least partially.

The process may begin by computing saturation statistics of the digital image (act 402). FIG. 5 illustrates one example of how the saturation statistics may be computed for the digital image.

The process may begin with processor 120 constructing a histogram of the saturation values of pixels of the digital image (act 502). Next, processor 120 may compute a median saturation value based on the constructed histogram (act 504).

Returning to FIG. 4, an inflection point of an s-curve may be set based on the computed saturation statistics (act 404). In one embodiment, this may be achieved by setting a value of t in equation 1 according to the computed median saturation value. Thus, 50% of the digital image, by area, may have increased saturation as a result of saturation contrast enhancement, and 50% of the digital image, by area, may have decreased saturation as a result of saturation contrast enhancement. By setting the inflection point based on the computed median saturation, a widest variety of images may be accommodated.

A magnitude of the s-curve may be based on the one user-supplied parameter (act 406). Thus, by setting the value of m in equation 1, a function, in this example an s-curve, may be defined.

Returning to FIG. 3, processor 120 may access information regarding a first pixel of the digital image (act 306). The information may include a saturation value and a luminance value. Processor 120 may then determine whether the luminance value is greater than or equal to a threshold value (i.e., a luminance threshold condition is satisfied) (act 308). If the luminance value is greater than or equal to the threshold value, then processor 120 may adjust saturation contrast by applying the saturation value to the function to obtain an enhanced saturation value (act 310). Otherwise, if the luminance threshold condition is not satisfied, the saturation value of the pixel may remain unchanged.

Processor 120 may then determine whether there are additional pixels of the digital image to process (act 312). If there are no additional pixels to process, then the process is complete. Otherwise, processor 120 may access information regarding a next pixel of the digital image (act 314) and acts 308-312 may be repeated.

The exemplary process of FIG. 3 preserves saturation values with respect to pixels with low luminance. Increasing saturation contrast may magnify hue fluctuations that are caused by low-level noise in the digital image. By enhancing saturation values of only ones of the pixels of the digital image that satisfy the luminance threshold condition, saturation may be enhanced everywhere in the digital image except for darker areas, where the digital image retains only the low-level noise present in an original version of the digital image.

In embodiments in which luminance thresholding is not performed, act 308 of FIG. 3 may be eliminated and the saturation values of all of the pixels of the digital image may be enhanced by performing act 310 with respect to each and every one of the pixels of the digital image.

Returning to FIG. 2, process 120 may then convert the second color space back to the original color space (act 208). A saturation-contrast-enhanced, or saturation-contrast-adjusted, version of the digital image may then be presented on output device 160, which may be a display device, a printer, or other output device capable of presenting a digital image, and/or the saturation-contrast-enhanced, or the saturation-contrast-adjusted, version of the digital image may be saved to a storage device, such as, for example, a hard disk, an optical disc, a flash RAM storage device, or other type of storage device (act 210).

In another embodiment of the process of FIG. 2, acts 204 and 208 may only be performed if the original color space of the digital image does not include a saturation channel. For example, after act 202 is performed, processor 120 may perform a check to determine whether the original color space includes a saturation channel (i.e., each one of the pixels of the input digital image in the original color space has a corresponding saturation value). If the original color space includes the saturation channel, then act 206 may be performed without performing act 204. After performing act 206, processor 120 may perform a second check to determine whether the original color space of the input digital image includes the saturation channel. If the original color space is determined to include the saturation channel, then act 208 may be skipped and act 210 may be performed to present the saturation-contrast-enhanced version of the digital image on output device 160.

Figure 6:
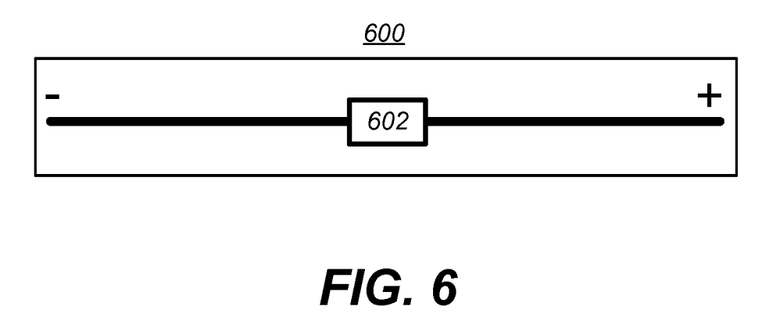
FIG. 6 illustrates an exemplary user interface for providing a user-provided parameter, upon which a function for enhancing saturation values may be based, at least partially.

In some embodiments, a user-supplied input parameter, such as a magnitude of an s-curve, representing a strength of a saturation contrast effect, may be input by a user via a user interface, such as, for example, a slider control displayed on a display screen. FIG. 6 illustrates an exemplary slider control 600 which a user may use to provide the magnitude. Slider control 600 includes a slider 602 which a user may move in a first direction (toward "+") to increase the magnitude and which the user may move in a second direction (toward "−") to decrease the magnitude. The user may move slider 602 by selecting slider 602 with a pointing device, such as, for example, a computer mouse, an electronic pen, a user's finger touching a slider 602 displayed on a touchscreen, or other pointing device, and dragging selected slider 602 in the first direction or the second direction.

In other embodiments, other methods may be used to input the magnitude. For example, a joystick or other controller device may be used to input the magnitude. Further, in other embodiments the user may input a value for the magnitude via a keyboard.

The above-mentioned embodiments are only exemplary. In other embodiments, a function for enhancing saturation contrast of digital images may be a different s-curve, or another function. In addition, other user-supplied parameters may be input, in numerous ways, to define the function. Methods for inputting other user-supplied parameters may include, but not be limited to, using a keyboard, using a numeric keypad, and using a displayed keyboard or displayed numeric keypad on a touchscreen display of a digital imaging tool.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by processes, such as the processes illustrated by FIGS. 3-5, may be different and/or may include additional or other acts. Additionally, in other embodiments, the processes illustrated by FIGS. 3-5 may be performed by a number of processing devices, which communicate with one another via a network, and act as a single larger processing device.

Accordingly, the appended claims and their legal equivalents define embodiments, rather than any specific examples given.

We claim as our invention:

1. A machine-implemented method for enhancing a saturation contrast of a digital image, the machine-implemented method comprising:

converting, by a digital imaging tool, an original color space of a digital image to a second color space having a saturation channel;

applying a saturation contrast enhancement to original saturation values of the saturation channel, based, at least partially, on at least one user-provided parameter to produce enhanced saturation values, the at least one user-provided parameter including a magnitude value representing a strength of a saturation effect, the applying a saturation contrast enhancement further comprising:

computing saturation statistics of the digital image, the saturation statistics including a median saturation value of the digital image, computing an s-curve based, at least partially, on the at least one user-provided parameter, a position of an inflection point of the s-curve being based on the median saturation value, and producing the enhanced saturation values based on the original saturation values and the computed s-curve;

converting, by the digital imaging tool, the second color space, including the saturation channel with the enhanced saturation values, to the original color space; and outputting or saving, using the original color space, a saturation-contrast-enhanced digital image, the saturation-contrast-enhanced digital image being based, at least partially, on the enhanced saturation values of the saturation channel of the second color space.

2. The machine-implemented method of claim 1, wherein the second color space is a perceptually uniform color space.

3. The machine-implemented method of claim 1, wherein the applying of a saturation contrast enhancement to original saturation values of the saturation channel to produce enhanced saturation values further comprises:
independently producing, by the digital imaging tool, a respective enhanced saturation value for at least some of a plurality of pixels of the digital image.

4. The machine-implemented method of claim 3, wherein the independent producing of a respective enhanced saturation value is performed only for ones of the plurality of pixels that satisfy a luminance threshold condition.

5. The machine-implemented method of claim 3, wherein the applying of a saturation contrast enhancement to original saturation values of the saturation channel to produce enhanced saturation values further comprises:
applying, by the digital imaging tool, the original saturation values to the s-curve to produce the enhanced saturation values.

6. The machine-implemented method of claim 1, wherein the second color space is an HSV color space.

7. The machine-implemented method of claim 1, wherein the s-curve is defined as:

$$f(x) = (1-m) + m\left(s + Q(s)\left(\frac{1}{1+e^{P(t)k(s+Q(s)x)+1}}\right)\right),$$

where m is the magnitude value, such that 0<m<1,
t is an input threshold value, such that −0.5<t<0.5,
s is ceiling(t),
Q(s)=1-2 s, and $$P(t) = \frac{2}{1+\alpha|t|^{0.3} - \beta|t|^{0.6}}.$$

wherein k=6.0, α=0.3758773, and β=1.9481615.

8. A digital imaging tool for enhancing a saturation contrast of a digital image, the digital imaging tool comprising:
at least one processor; and
a memory connected to the at least one processor, the memory comprising instructions for the at least one processor to perform a method comprising:
converting an original color space of the digital image to a second color space having a saturation channel, when the original color space lacks a saturation channel;
enhancing the saturation contrast of the digital image such that some pixels of a saturation-contrast-enhanced digital image will have increased saturation values and other pixels of the saturation-contrast-enhanced digital image will have decreased saturation values, the enhancing the saturation contrast of the digital image further comprising:
receiving at least one user-provided parameter,
computing a median saturation value of the digital image,
computing an s-curve based on a magnitude value representing a strength of a saturation contrast effect, the magnitude value being included in the at least one user-provided parameter, a position of an inflection point of the s-curve being based on the computed median saturation value, and
producing enhanced saturation values for the saturation-contrast-enhanced digital image based on original saturation values of the saturation channel and the computed s-curve;
converting the second color space to the original color space if the original color space of the digital image was previously converted to the second color space, and
outputting or saving, using the original color space, the saturation-contrast-enhanced digital image.

9. The digital imaging tool of claim 8, wherein the second color space is a perceptually uniform color space.

10. The digital imaging tool of claim 8, wherein the enhancing the saturation contrast of the digital image further comprises adjusting respective saturation values of only ones of a plurality of pixels of the digital image that satisfy a luminance threshold condition.

11. The digital imaging tool of claim 8, wherein:
the magnitude value is provided via a user interface including a slider control.

12. The digital imaging tool of claim 8, wherein:
the enhancing the saturation contrast of the digital image further comprises:
applying the s-curve to independently adjust respective saturation values of at least some of a plurality of pixels of the digital image.

13. The digital imaging tool of claim 8, wherein the second color space is CIELCH.

14. The digital imaging tool of claim 8, wherein the s-curve is defined as:

$$f(x) = (1-m) + m\left(s + Q(s)\left(\frac{1}{1+e^{P(t)k(s+Q(s)x)+1}}\right)\right),$$

where m is the magnitude value, such that 0<m<1,
t is an input threshold value, such that −0.5<t<0.5,
s is ceiling(t),
Q(s)=1-2 s, and $$P(t) = \frac{2}{1+\alpha|t|^{0.3} - \beta|t|^{0.6}}.$$

wherein k=6.0, α=0.3758773, and β=1.9481615.

15. A tangible machine-readable medium having instructions recorded thereon for at least one processor of a processing device, the instructions comprising:
instructions for converting an original color space of a digital image to a perceptually uniform color space having a saturation channel;
instructions for receiving at least one user-provided parameter for adjusting a saturation contrast of the digital image, the at least one user-provided parameter including a magnitude value representing a strength of a saturation contrast effect;
instructions for adjusting the saturation contrast of the digital image based, at least partially, on the received at least one user-provided parameter, the instructions for adjusting the saturation contrast of the digital image further comprising:
    instructions for computing saturation statistics including a median saturation value of the digital image,
    instructions for computing an s-curve based, at least partially, on the magnitude value,
    instructions for positioning an inflection point of the s-curve based on the computed saturation statistics, and
    instructions for adjusting the saturation contrast of the digital image based on the computed s-curve;
    instructions for converting the perceptually uniform color space back to the original color space; and
    instructions for outputting, using the original color space, a saturation-contrast-adjusted digital image.

16. The tangible machine-readable medium of claim 15, wherein the instructions further comprise:
    instructions for determining whether a plurality of pixels of the digital image satisfy a luminance threshold condition, and
    the instructions for adjusting the saturation contrast of the digital image further comprise instructions for adjusting respective saturation values of only ones of the plurality of pixels that satisfy the luminance threshold condition.

17. The tangible machine-readable medium of claim 15, wherein:
    the instructions for receiving at least one user-provided parameter further comprise instructions for receiving the magnitude value via a user interface including a slider control settable by a user.

18. The tangible machine-readable medium of claim 15, wherein the instructions for computing saturation statistics further comprise:
    instructions for generating a histogram of saturation values of a plurality of pixels of the digital image, and
    instructions for determining the median saturation value of the digital image based on the generated histogram of the saturation values.

19. The tangible machine-readable medium of claim 15, wherein the s-curve is defined as:

$$f(x) = (1 - m) + m\left(s + Q(s)\left(\frac{1}{1 + e^{P(t)k(s+Q(s)x)+1}}\right)\right),$$

where m is the magnitude value, such that 0<m<1,
t is an input threshold value, such that −0.5<t<0.5,
s is ceiling(t),
Q(s)=1-2 s, and $$P(t) = \frac{2}{1 + \alpha|t|^{0.3} - \beta|t|^{0.6}}.$$

wherein k=6.0, α=0.3758773, and β=1.9481615.

20. A machine-implemented method comprising:
    converting an original color space of a digital image to a second color space having a saturation channel;
    applying a saturation contrast enhancement to original saturation values of the saturation channel to produce enhanced saturation values, the applying comprising:
        computing saturation statistics of the digital image, including determining a median saturation value of the digital image, and
        computing an s-curve, wherein an inflection point of the s-curve is based on the median saturation value;
    converting the second color space, including the saturation channel with the enhanced saturation values, to the original color space; and
    outputting or saving, using the original color space, a saturation-contrast-enhanced digital image, the saturation-contrast-enhanced digital image being based, at least partially, on the enhanced saturation values of the saturation channel of the second color space.

21. A digital imaging tool comprising:
    at least one processor; and
    a memory connected to the at least one processor, the memory comprising instructions for the at least one processor to perform a method comprising:
        enhancing a saturation contrast of a digital image with a saturation channel, comprising:
            computing a median saturation value of the digital image,
            computing an s-curve, a position of an inflection point of the s-curve being based on the computed median saturation value, and
            producing enhanced saturation values for the saturation-contrast-enhanced digital image based on original saturation values of the saturation channel and the computed s-curve.

22. A machine-readable storage device having instructions recorded thereon for at least one processor of a processing device, the instructions comprising:
    converting an original color space of a digital image to a perceptually uniform color space having a saturation channel;
    adjusting a saturation contrast of the digital image comprising:
        computing saturation statistics including a median saturation value of the digital image,
        computing a function, including positioning an inflection point of the function based on the median saturation value, and
        adjusting the saturation contrast of the digital image based on the computed function;
    converting the perceptually uniform color space back to the original color space; and
    outputting, using the original color space, a saturation-contrast-adjusted digital image.

23. The machine-readable storage device of claim 22, wherein the adjusting the saturation contrast of the digital image further comprises:
    receiving at least one user-provided parameter, including a magnitude value representing a strength of a saturation contrast effect, and
    computing the function based, at least partially, on the magnitude value.

* * * * *